United States Patent [19]

Matthies

[11] Patent Number: 5,669,660

[45] Date of Patent: Sep. 23, 1997

[54] INFLATABLE MOTORCYCLE SEAT

[76] Inventor: Lawayne L. Matthies, 1888 Mountain Creek Pky., Dallas, Tex. 75211

[21] Appl. No.: 659,923

[22] Filed: Jun. 7, 1996

[51] Int. Cl.[6] ............................................. B62J 1/18
[52] U.S. Cl. ..................... 297/195.13; 248/206.3; 297/395; 297/452.41
[58] Field of Search ............................ 297/195.13, 214, 297/219.1, 395, 397, 452.41; 4/546, 547, 559, 571.1, 573.1, 575.1, 579–583, DIG. 8; 248/206.2, 206.3

[56] References Cited

U.S. PATENT DOCUMENTS

| | | | |
|---|---|---|---|
| 1,953,798 | 4/1934 | Grandcourt | 4/575 |
| 2,260,437 | 10/1941 | Chambers | 297/452.41 |
| 3,712,670 | 1/1973 | Suchla et al. | 297/214 X |
| 4,842,330 | 6/1989 | Jay | 297/452.41 |
| 5,054,855 | 10/1991 | Williams et al. | 297/395 |
| 5,322,345 | 6/1994 | Desser et al. | 248/206.3 X |
| 5,487,197 | 1/1996 | Iskra, Jr. et al. | 297/452.41 X |

*Primary Examiner*—Peter R. Brown
*Attorney, Agent, or Firm*—Andrew M. Hassell

[57] ABSTRACT

A portable detachable and inflatable motorcycle seat which is adapted for temporary attachment to a motorcycle. It includes an outer case of flexible water repellent material having a longitudinally disposed zipper along one side to provide ready access to the interior. Within the interior there is an inflatable bladder having a connected air passage for introducing or evacuating air therefrom, while on the exterior of one major surface of the case there are disposed a plurality of suction cups for attachment to the motorcycle. Extensions from the suction cups extend into and through the inflatable bladder to strengthen the assembly and to provide reliable attachment. When the seat is not in use, air may be evacuated from the bladder so that the seat can be collapsed and folded into a very small and compact article to enhance portability and storage.

20 Claims, 2 Drawing Sheets

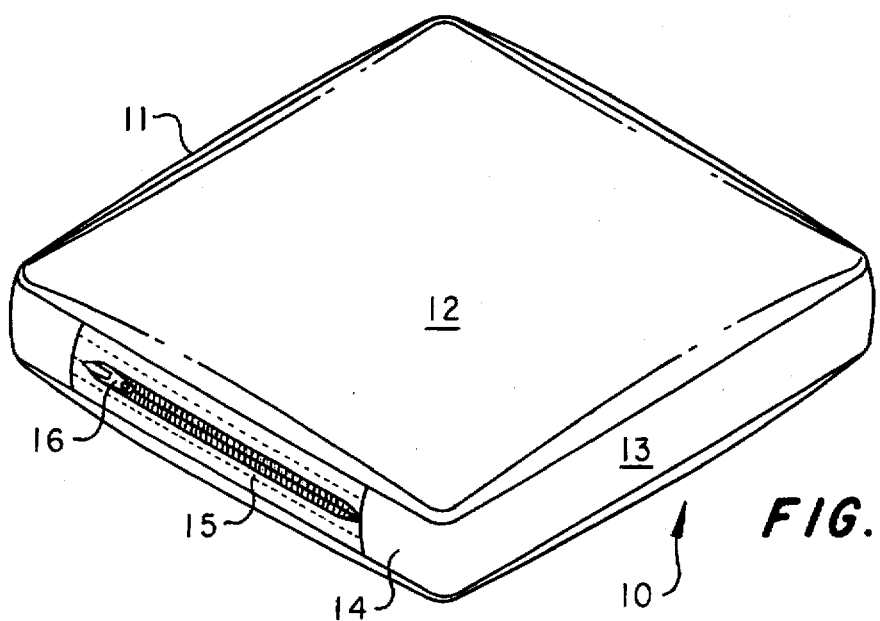
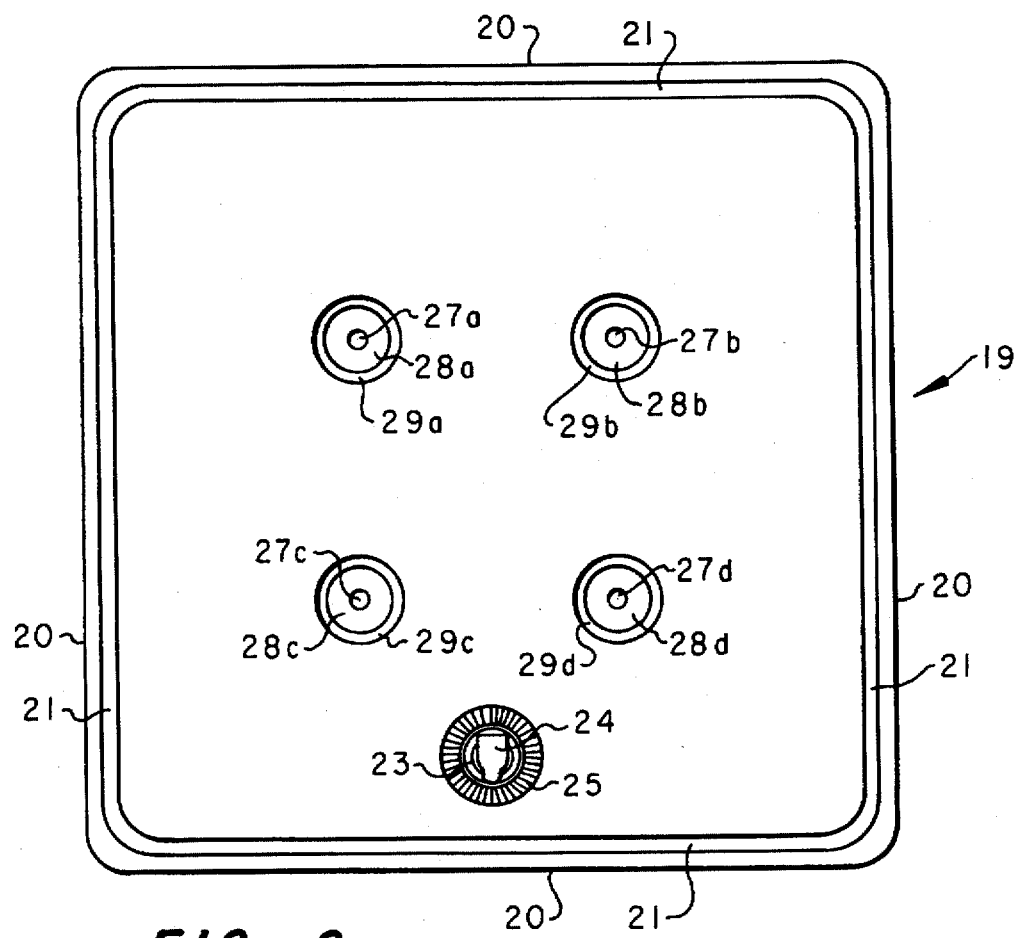

INFLATABLE MOTORCYCLE SEAT

This invention relates to motorcycle seats and more particularly to such seats that are small, light and collapsible for carrying while being readily inflatable for deployment on a motorcycle.

BACKGROUND OF THE INVENTION

Portable detachable motorcycle seats have heretofore been proposed, illustrative of which are those described in U.S. Pat. No. 5,322,345 granted Jun. 21, 1994 to A. Wilhelm Desset and Dale M. Duyck. In that patent, there is disclosed a removable motorcycle fender seat that may be attached to the fender of a motorcycle by a plurality of suction cups, forces exerted by a magnetic sheet or a combination of both suction cups and magnetic forces. Such seat is said to be constructed of a moldable plastic or molded closed-cell, foam-like composition and has a substantially rectangular but tapered block construction. The top surface is a flat planar surface, while the base is arcuately shaped to have substantially the same radius of curvature as the lateral radius of curvature of the motorcycle fender. It is also configured to accommodate for the longitudinal radius of curvature of the fender by being linearly tapered along the bottom right and left facing walls.

While the prior art proposals, as represented by the foregoing patent, represent improvements, there has continued to be a need for further advancements in the field and for a collapsible seat that may be readily collapsed into a small unit for portability or ease of storage.

BRIEF SUMMARY OF THE INVENTION

The improved seat according to the invention hereof includes an outer case of flexible material which can readily be folded into a small compact package. The bottom exterior surface of the case is fitted with a plurality of outwardly projecting suction cups adapted for attachment to rear fenders of conventional motorcycles. Within the case there is disposed an inflatable bladder of resilient material, which when inflated, substantially fills the interior volume of the case to expand it into the desired seat shape. Pluralities of apertures through the bottom exterior surface of the case are disposed in registration with a corresponding plurality of apertures through the bladder so that projections from the aforementioned suction cups severally extend through the apertures in the case and the corresponding apertures in the bladder. Thus, there is provided an improved attachable/detachable seat that may be removed from a motorcycle, deflated and then folded into a very small unit for transport or storage.

OBJECTS AND FEATURES OF THE INVENTION

It is one general object of the invention to improve portable motorcycle seats.

It is another object of the invention to facilitate portability and storage of motorcycle seats.

It is yet another object of the invention to provide a simple and reliable assembly of a seat casing, its inflatable interior and attaching suction cups.

Accordingly, in accordance with one feature of the invention, an inflatable bladder is fitted within an exterior case of flexible water repellent material thus facilitating deployment in use and minimization of size for storage.

In accordance with another feature of the invention, the principal parts of the seat are made of readily available and inexpensive materials, thus enhancing reduction in cost.

In accordance with still another feature of the invention, the inflatable bladder and exterior case are each provided with a plurality of apertures corresponding in number to the number of attached suction cups, thereby facilitating assembly of the seat.

In accordance with yet another feature of the invention, an extension is provided on each of the aforementioned suction cups to facilitate projection through the aligned apertures of the bladder and exterior case, thus further facilitating assembly and use of the seat.

These and other objects and features of the invention will be apparent from the following description, by way of example of a preferred embodiment, with reference to the drawing.

BRIEF DESCRIPTION OF THE DRAWING

FIG. 1 is a perspective view of a seat constructed in accordance with the principles of the invention and depicting the outer case thereof;

FIG. 2 is a top view of a bladder which is contained within the outer case;

DESCRIPTION OF A PREFERRED EMBODIMENT

Figure 3:
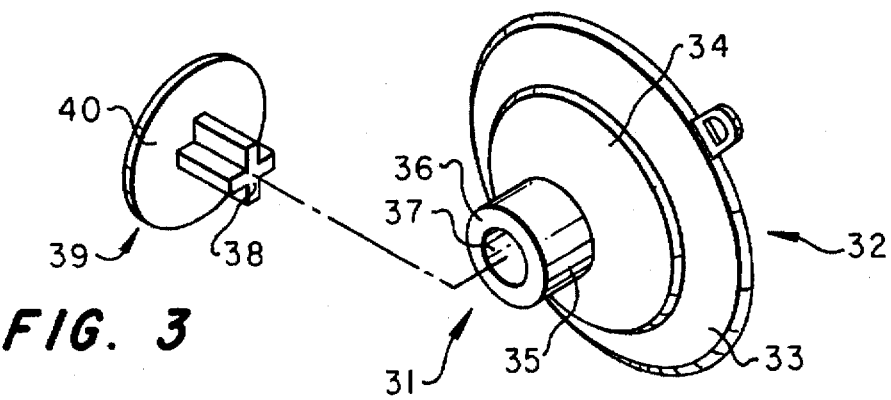
FIG. 3 is an exploded view depicting the details of one of the suction cup/reinforcing assemblies of the assembly.

Now turning to the drawing, and more particularly FIG. 1 thereof, it will be seen to be a perspective view of a seat 10 constructed in accordance with the principles of the invention. There, in FIG. 1 are seen the outer case 11 of the seat 10, the top surface 12 of the outer case which may be essentially planar or semi-planar (as shown), a first side 13, a second side 14 having a longitudinal slot 15 fitted with conventional zipper 16 which is included to provide ready access to the interior of case 11. The seat in FIG. 1 is shown in its inflated condition with the walls extended for use and attachment to a motorcycle (not shown).

Within the outer case 11 there is disposed an inflatable bladder as depicted in FIG. 2. There, in FIG. 2, there is shown a top view of the preferred bladder 19. Such bladder is made of conventional resilient and flexible material, preferably of conventional plastic such as urethane. It is sealed around its peripheral-edges 20 as by conventional heat sealing, thus forming a sealing strip 21. Also included are inflating-deflating tube 23 which is fitted with a conventional interior valve and closure tab 24. Inflating/deflating tube 23 is surrounded by conventional reinforcing collar 25.

Further reference to FIG. 2 reveals the presence of four apertures 27a–27d that each extend entirely through the bladder 19. These apertures are preferably though not necessarily circular in geometry, and they each are surrounded by concentric collar portions 28a–28d and 29a–29d which are portions of the bladder 19 that are sealed together so as to make the bladder air tight and prevent air therein from entering or escaping other than through inflating/deflating tube 23. By providing two concentric and adjacent sealing collars surrounding each aperture, the integrity of sealing is enhanced and the bladder made less susceptible of leakage. In addition, the need for a separate collar member for each aperture is obviated.

When the bladder 19 is inflated as by removing closure tab 24 to permit oral inflation, portions between sealing strip 21 and the concentric collars 29a–29d are inflated and distended. As mentioned above, inflating/deflating tube 23 is provided with a conventional valve therein to prevent unwanted escape of air from within bladder 19. However, as is well known to those skilled in the art, when it is desired to deflate the bladder, the inflating/deflating tube 23 is gently pinched to open its valve and permit escape of air from within.

Now turning to FIG. 3, it will be seen to be an exploded view depicting the details of one of the plurality (four in the preferred embodiment) of suction cup/reinforcing members preferably employed in practicing the invention. There, it will be seen, are suction cup assembly 31 comprising a main body 32 of molded resilient plastic material. Suction cups of this type which have been found suitable are readily available commercially; and one such cup is sold by Adams Manufacturing Company of 109 West Park Road, Portersville, Pa. 16051.

The rim portion 33 is made thinner than the central portion 34 so as to impart greater resilience to rim 33 to aid in sealing to a motorcycle support (e.g., a fender). The added thickness of central portion 34 additionally strengthens the suction cup at its center where fastening extension 35 extends therefrom.

Fastening extension 35 is seen preferably to be cylindrical in geometry, with cylindrical walls 36 surrounding cylindrical recess 37 into which, when the suction cup is installed, a projection 38 of fastening member 39 is press fit or otherwise affixed. Fastening member 39 (preferably made of conventional material such as nylon) is seen also to include a preferably circular flange 40 to provide a relatively large area of contact with an adjacent surface 28a–28d of the bladder 19. It will thus be evident that when the suction cups are installed, one for each aperture 27a–27d of bladder 19, a fastening extension 35 extends through each such aperture and is held in place by a fastening member 39. Fastening members which have been found suitable are those identified as Christmas Tree Clips such as are sold by Nylon Molding Corporation of 1617 S. California Avenue, Monrovia, Calif. 91016.

Figure 4:
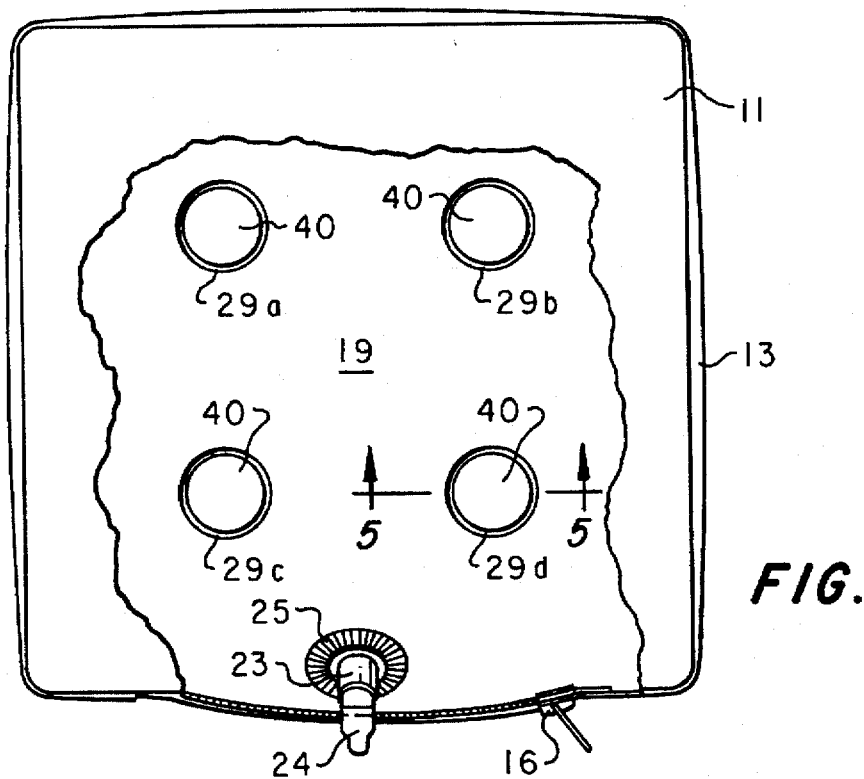
FIG. 4 is a partial cut-away view illustrating the positioning of the bladder and suction cup/reinforcing assemblies within the outer case.
Figure 5:
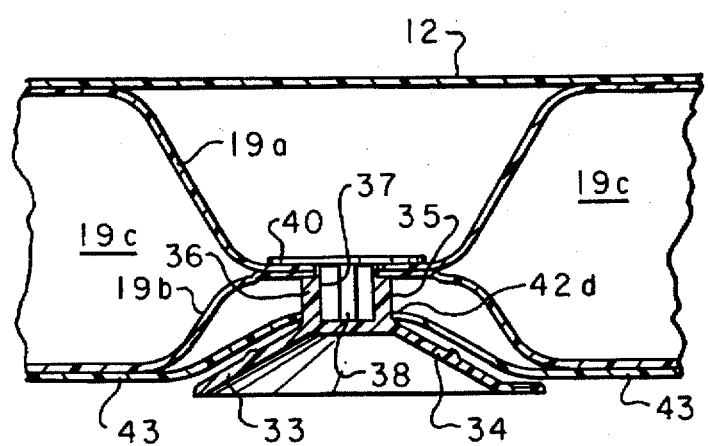
FIG. 5 is a section taken along section lines 5—5 of FIG. 4 and illustrating details of the outer case, bladder and suction cup/reinforcing assemblies of FIG. 3.

FIG. 4 is a partial cut-away view illustrating the positioning of the bladder and suction cup/reinforcing assemblies when the bladder 19 is positioned within its outer case 11. There, it will be seen are four circular flanges 40 of the fastening members 39 of the above-described suction cup assemblies 31. As will be seen more clearly in FIG. 5, the fastening extensions 38 of the suction cups severally project through apertures 27a–27d, while corresponding members 35 project through apertures 42a–42d that are located in bottom 43 of outer case 11 in axial registration with apertures 27a–27d. At this point, it should be noted that the sectional view of FIG. 5 is equally applicable to the remaining three regions of FIG. 4 as identified by symbols 40 and 29a–29c. Accordingly, when the bladder 19 is installed within case 11, apertures 27a–27d are disposed in axial registration with corresponding apertures 42a–42d (only 42d being actually shown in FIG. 5) so as to permit fastening of the bladder 19 to case 11 by the four installed suction cup assemblies.

Now referring in detail to FIG. 5, it will be observed that, as mentioned previously, it is a section taken along section lines 5—5 of FIG. 4 and illustrates details of the outer case 11, bladder 19 and suction cup/reinforcing assemblies 31 when installed. There, It will be seen are top surface 12 of outer case 11, top and bottom walls 19a and 19b of bladder 19, inner regions 19c of bladder 19, rim and central portions 33 and 34 of suction cup main body 32 (FIG. 3), and bottom 43 of outer case 11. It will thus be seen that the aforementioned apertures 42a–42d are in axial alignment (registration) with corresponding apertures 27a–27d so that insertion of projections 35 and 38, through the aligned apertures, and the subsequent affixing thereof through insertion of projections 38 within cylindrical recesses 37 fastens the bladder in the desired position within outer case 11. At the same time, it results in the deployment on the bottom exterior of case 11 of the four aforementioned suction cups so that they can readily be detachably emplaced on a suitable exterior part (e.g., fender) of a motorcycle.

As mentioned above, when it is desired to install the seat on the motorcycle, the bladder is inflated, and the seat is simply pressed down onto the supporting surface to squeeze air out of the suction cups in a conventional manner. When it is desired to remove the seat, the vacuum within the suction cups may be broken in any convenient way such as, for example by slipping a knife edge between the cup and the adjacent surface. Thereafter, if desired, the air within the bladder may be exhausted by unplugging the inflating/deflating tube and pinching it to open its valve. After the air is exhausted, the seat may be easily folded into a very small and compact unit for carrying or storing.

It will now be evident that there has been described herein, an improved portable and detachable motorcycle seat that offers a number of advantages.

Although the inventions hereof have been described by way of a preferred embodiment, it will be evident that other adaptations and modifications may be employed without departing from the spirit and scope thereof. For example, the external geometry could be oval or circular. In addition, the bladder could be multi-chambered, thus affording an even greater protection against air leakage.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A portable detachable inflatable motorcycle seat comprising:
   (a) an outer case of water repellent material having predetermined dimensions to form top, bottom and sides to enclose an interior of said case; said case having an opening providing access to said interior;
   (b) an inflatable bladder disposed within said case, said bladder having upper and lower surfaces joined to one another along a perimeter thereof, said upper and lower surfaces also being joined to one another at a plurality of spaced locations located interiorly of said perimeter to form recessed portions in said bladder, said recessed portions each including an aperture extending through both the upper and lower surfaces; said bladder further including a port extending from the exterior of said bladder to the interior of said bladder for introducing and exhausting air therethrough;
   (c) a predetermined number of flexible suction cups each having a projection extending therefrom; and
   (d) means for individually extending said projections through said apertures to affix said suction cups to said bladder.

2. A seat according to claim 1 wherein said outer case is generally arcuate.

3. A seat according to claim 1 wherein said outer case is generally rectangular.

4. A seat according to claim 3 wherein said sides are four in number.

5. A seat according to claim 1 wherein said opening includes a longitudinally disposed slot along one side of said case.

6. A seat according to claim 5 wherein said longitudinally disposed slot includes a zipper for opening and closure.

7. A seat according to claim 1 wherein said case includes a plurality of openings corresponding in number to said apertures said apertures and said openings being individually axially aligned.

8. A seat according to claim 7, wherein individually said projections extend through both said apertures and said openings.

9. A seat according to claim 1 wherein said apertures through said bladder include means for preventing escape of air therethrough.

10. A seat according to claim 1 wherein said projections extend from the centers of said suction cups.

11. A seat according to claim 1 wherein said port includes a flexible tube.

12. A seat according to claim 11 wherein said flexible tube includes a valve.

13. A portable detachable inflatable motorcycle seat comprising:

(a) an outer generally rectangular case of water repellent material having a predetermined width, length and thickness to form top, bottom and sides to enclose an interior of said case; said case having along one of said sides a longitudinally disposed slot providing access to said interior;

(b) an inflatable bladder disposed within said case, said bladder having upper and lower surfaces joined to one another along a perimeter thereof, said upper and lower surfaces also being joined to one another at a plurality of spaced locations located interiorly of said perimeter to form recessed portions in said bladder, said recessed portions each including an aperture extending through both the upper and lower surfaces; said bladder further including a port extending from the exterior of said bladder to the interior of said bladder for introducing and exhausting air therethrough;

(c) a predetermined number of flexible suction cups each having a projection extending therefrom; and (d) means for individually extending said projections through said apertures to affix said suction cups to said bladder.

14. A seat according to claim 13 wherein said opening comprises a longitudinally disposed slot along one side of said case said slot including a zipper for opening and closing said slot.

15. A seat according to claim 13 wherein said case includes a plurality of openings corresponding in number to said apertures said apertures and said openings being individually axially aligned.

16. A seat according to claim 15 including means for individually extending said projections through said pairs of apertures to affix said suction cups to both said bladder and said case.

17. A seat according to claim 13 wherein said apertures through said bladder include means for preventing escape of air therethrough.

18. A seat according to claim 13 wherein said projections extend from the centers of said suction cups.

19. A seat according to claim 13 wherein said port includes a flexible tube.

20. A seat according to claim 19 wherein said flexible tube includes a valve.

* * * * *